United States Patent [19]

Eichberger et al.

[11] Patent Number: 5,088,325
[45] Date of Patent: Feb. 18, 1992

[54] SYSTEM FOR INDICATING A CONDITION OF MATERIAL

[75] Inventors: Robert T. Eichberger, Mt. Clemens; Scott M. Hewelt, Marine City, both of Mich.

[73] Assignee: Bindicator Company, Port Huron, Mich.

[21] Appl. No.: 653,135

[22] Filed: Feb. 11, 1991

[51] Int. Cl.$^5$ .................. G01F 23/26; G01R 27/26; G01R 35/00
[52] U.S. Cl. .................. 73/304 C; 73/1 H; 307/358; 324/519; 324/601
[58] Field of Search .................. 73/304 C, 1 H, 640; 361/284; 324/601, 519; 331/65

[56] References Cited

U.S. PATENT DOCUMENTS

| | | | |
|---|---|---|---|
| 4,499,640 | 2/1985 | Brenton et al. | 73/304 C |
| 4,499,766 | 2/1985 | Fathauer et al. | 73/304 C |
| 4,624,139 | 11/1986 | Collins | 324/607 X |
| 4,676,100 | 6/1987 | Eichberger | 73/1 H |
| 4,794,320 | 12/1988 | Chang | 324/607 X |
| 4,800,755 | 1/1989 | Fathauer et al. | 73/304 C |

Primary Examiner—Daniel M. Yasich
Attorney, Agent, or Firm—Barnes, Kisselle, Raisch, Choate, Whittemore & Hulbert

[57] ABSTRACT

A system for indicating level of material in a vessel as a function of material capacitance includes a capacitance probe adapted to be positioned so as to be responsive to variations in capacitance as a function of material level in the vessel. Detection circuitry is responsive to capacitance at the probe and to a reference signal for indicating material level, and includes facility for selectively adjusting sensitivity of the detection circuitry to material capacitance so as to adapt the system for materials of differing capacitance characteristics. Calibration circuitry for establishing the reference signal includes facility for varying operating characteristics of the detection circuitry during a calibration mode of operation independent of material level so as to calibrate the detection circuitry to capacitance at the probe. The detection circuitry is responsive to a comparison between the reference signal and capacitance at the probe for indicating when the circuitry is out of calibration, and is coupled to the sensitivity adjustment for varying such comparison as a function of the differing material capacitance characteristics.

5 Claims, 3 Drawing Sheets

SYSTEM FOR INDICATING A CONDITION OF MATERIAL

The present invention is directed to systems for indicating a condition of material as a function of electrical properties of the material, and more particularly to a system for indicating level of material in a storage vessel as a function of material capacitance.

BACKGROUND AND OBJECTS OF THE INVENTION

Use of capacitance-type detection techniques for sensing level of material in a storage vessel has been widely proposed and is reasonably well understood in the art. In general, calibration in the field has been a time-consuming and laborious process requiring the efforts of a skilled or semi-skilled operator. There has been a need in the art for a system embodying facility for automatic on-demand calibration which does not require intervention by a skilled operator.

U.S. Pat. No. 4,499,766 discloses a system and probe for indicating the level of material in a vessel as a function of material capacitance. The disclosed system includes a resonant circuit having a capacitance probe adapted to be disposed in a vessel so as to be responsive to variations in capacitance as a function of material level. An oscillator has an output coupled to the resonant circuit and to a phase detector for detecting variations in phase angle as a function of probe capacitance. Level detection circuitry is responsive to an output of the phase detector, and to a reference signal indicative of a predetermined level of material, for indicating material level as a function of a difference between the reference signal and capacitance at the probe. Sensitivity of detection is adjustable for accommodating materials of differing dielectric constants. In the preferred embodiments disclosed in such application, a push-button automatic calibration circuit adjusts the resonance characteristics of the parallel resonant circuit, or adjusts the reference signal indicative of a predetermined reference material level.

U.S. Pat. No. 4,624,139 discloses a material level indicating system which includes a bridge circuit with a capacitance material level probe in one bridge arm. An adjacent bridge arm includes a plurality of fixed capacitors coupled to controlled electronic switches for selective connection into the bridge circuit. The bridge circuit is powered by an oscillator, and a differential amplifier is connected across the bridge circuit for detecting balance conditions at the bridge. A push-button automatic calibration circuit includes a digital counter having outputs connected to the electronic switches. A comparator is responsive to the differential amplifier for enabling operation of the counter during a calibration mode of operation for selectively connecting the fixed capacitors into the bridge circuit until a preselected balance condition, corresponding to a preselected reference material level, is obtained. Thereafter, the differential amplifier is responsive to variation of probe capacitance from the reference level to indicate material level.

Automatic calibration technology discussed in the preceding paragraphs has enjoyed substantial commercial acceptance and success in the material level control market. In systems heretofore marketed under the aforementioned U.S. Pat. No. 4,499,766, a pair of LED's are provided for indicating operating characteristics of the circuit. One LED is coupled to the detection circuit output for indicating whether material is detected adjacent to the probe. Another LED is coupled to the automatic calibration circuit for indicating that the system is calibrated when the LED is illuminated, and indicating loss of calibration or pendency of a calibration operation when the LED is extinguished. Loss of calibration can occur as a result of a build-up of electrically conductive material on the probe that electrically interconnects the probe element to the surrounding guard shield. Since the probe is now driven by the guard amplifier, this material bridge has the effect of desensitizing the probe. A deficiency in systems heretofore proposed lies in the fact that circuitry for detecting loss of system calibration is not responsive to system sensitivity. For example, in a system set to be highly sensitive for use in connection with materials of low dielectric constant, a relatively small amount of conductive material on the probe would be sufficient to impair system calibration. On the other hand, in systems set to lower sensitivity, a relatively greater amount of conductive material on the probe would be required before the system can no longer operate as calibrated. It is therefore desirable to tailor detection of loss of calibration to system sensitivity selected by the user, and a principal object of the invention is to provide a system of the described character in which this objective is achieved.

SUMMARY OF THE INVENTION

A system for indicating a condition of material in accordance with the present invention includes a probe adapted to be positioned with respect to the material such that an electrical property of the probe varies as a function of material condition. Detection circuitry is coupled to the probe, and is responsive to the electrical property of the probe for indicating the desired material characteristic. The detection circuitry is thus coupled to the probe for providing a probe electrical signal that varies as a function of the monitored electrical property of the probe. The detection circuitry is calibrated such that the probe signal is at a predetermined reference level as a result of circuit calibration and independent of the material at the probe. The detection circuitry is thereafter responsive to variation of the probe signal from such first predetermined level to a second predetermined level for indicating the material characteristic. Sensitivity of the detection circuitry is selectively adjustable for accommodating materials of differing characteristics. Loss of calibration at the detection circuitry is indicated in response to the probe signal and the sensitivity adjustment. When the probe signal reaches a third level, a loss of calibration is indicated. The third level that indicates loss of calibration is automatically varied as a function of detection circuit sensitivity, such that departure of the probe signal from the first level to the third level needed to indicate loss of calibration at the detection circuitry increases with decreasing sensitivity at the detection circuitry.

A system for indicating level of material in a vessel as a function of material capacitance, in accordance with a presently preferred embodiment of the invention, includes a capacitance probe adapted to be positioned so as to be responsive to variations in capacitance as a function of material level in the vessel. Detection circuitry is responsive to capacitance at the probe and to a reference signal for indicating material level, and includes facility for selectively adjusting sensitivity of the detection circuitry to material capacitance so as to adapt the system for materials of differing capacitance characteristics. Calibration circuitry for establishing the reference signal includes facility for varying operating characteristics of the detection circuitry during a calibration mode of operation independent of material level so as to calibrate the detection circuitry to capacitance at the probe. The detection circuitry is responsive to a comparison between capacitance at the probe and the reference signal for indicating when the circuitry is out of calibration, and is coupled to the sensitivity adjustment for varying such comparison as a function of the differing material capacitance characteristics.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosures of above-noted U.S. Pat. Nos. 4,499,766 and 4,624,139, both assigned to the assignee hereof, are incorporated herein by reference for background disclosure of push-button automatic calibration circuitry in accordance with preferred implementations of the present invention.

Figure 1:
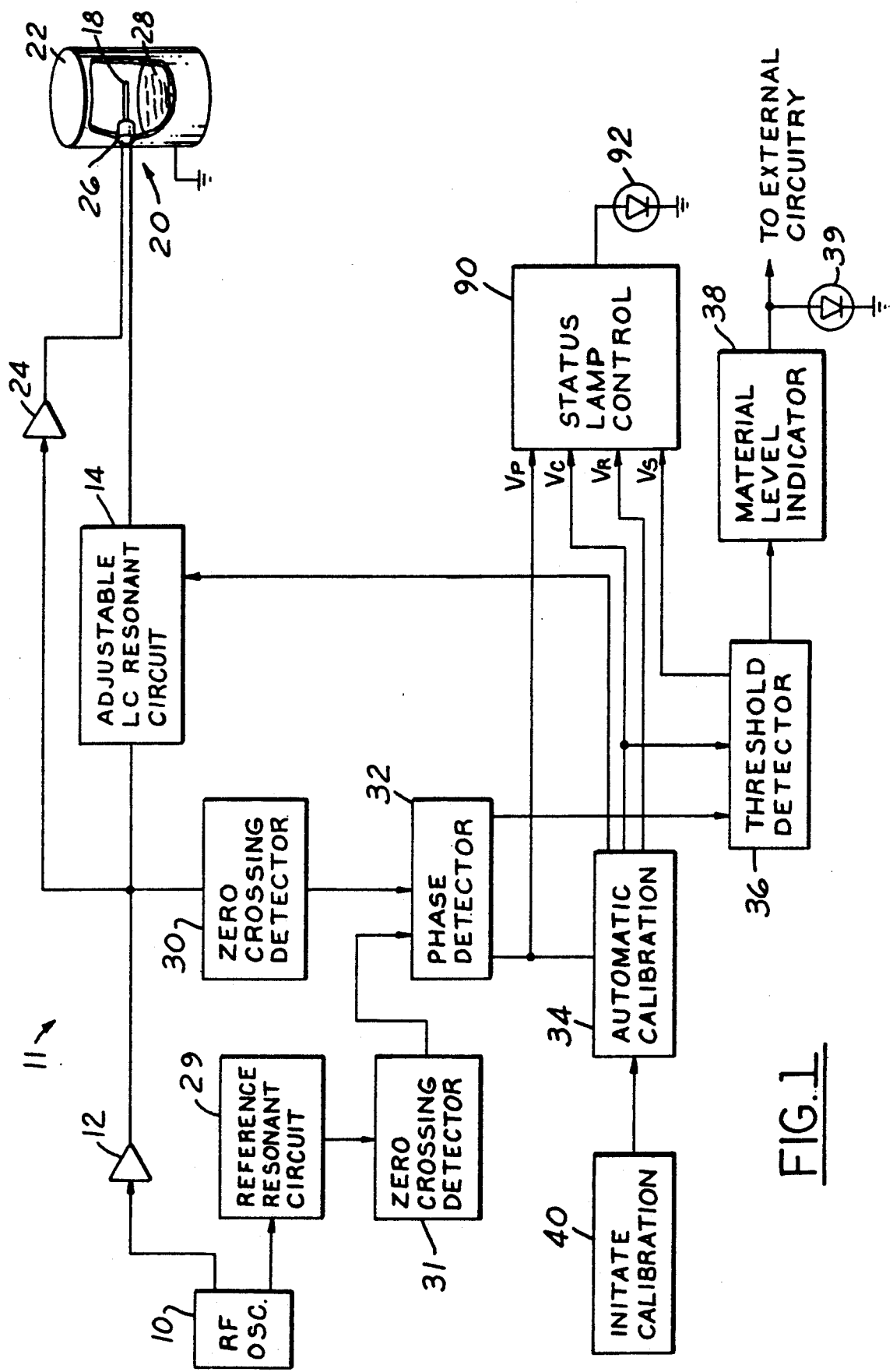
FIG. 1 is a functional block diagram of a presently preferred embodiment of a capacitance-type material level indicating system in accordance with the present invention.

FIG. 1 illustrates a presently preferred embodiment 11 of a material level indicating system in accordance with the invention as comprising an rf oscillator 10, which provides a periodic signal at a first output to a phase shift (ninety degrees) amplifier 12. The sinusoidal output of amplifier 12 is connected to an adjustable parallel LC resonant circuit 14. Resonant circuit 14 is connected to the probe conductor 18 of a probe assembly 20 mounted in the side wall of a storage vessel 22. The output of amplifier 12 is also connected through a unity-gain amplifier 24 having low output impedance to the guard shield 26 of probe assembly 20. The wall of vessel 22, which may be a storage bin for solid materials or a liquid storage tank, is connected to ground. As is well-known in the art, the capacitance between probe conductor 18 and the grounded wall of vessel 22 varies with the level of the material 28 stored therein and with material dielectric constant. This variation in capacitance is sensed by the remainder of the system electronics to be described hereinafter, and in greater detail in the referenced patents, to provide the desired indication of material level. Guard shield 26, which is energized by amplifier 24 at substantially the same voltage and phase as probe conductor 28, functions to prevent leakage of probe energy through material coated on the probe surface, and thus to direct probe radiation outwardly into the vessel volume so as to be more closely responsive to the level of material contained therein.

The sinusoidal output of amplifier 12 is fed through a zero-crossing detector 30 to one input of a phase detector 32. Phase detector 32 receives a square-wave second input through a reference resonant circuit 29 and a zero-crossing detector 31 from a second output of oscillator 10 ninety degrees out of phase with the oscillator output directed to amplifier 12. A first output of phase detector 32, which is a d.c. signal (Vp) at a level proportional to the phase relationship between the respective inputs, and thus responsive to variations in phase angle of the oscillator probe drive output due to changes in probe capacitance, is fed to an automatic calibration circuit 34. A second output of phase detector 32, which is also a d.c. signal indicative of input phase relationship, is directed to one input of a threshold detector 36. The outputs of phase detector 32 are identical but effectively isolated from each other. Automatic calibration circuit 34 provides a control input to adjustable LC resonant circuit 14, which receives a second input for adjustment purposes from oscillator 10. Calibration circuit 34 also provides a reference input (Vr) to threshold detector 36. The output of threshold detector 36 is fed through material level indicating circuitry 38 to an LED 39, and to external circuitry for controlling and/or indicating vessel material level as desired.

In general, automatic calibration circuitry 34 functions to adjust the resonance characteristics of resonant circuit 14 during a calibration mode of operation initiated by an operator-responsive circuitry 40, such as a push-button, connected thereto so as to establish, in effect, a reference capacitance level indicative of a preselected material condition in vessel 22 that exists during the automatic calibration mode. Preferably, the level of material in vessel 22 is first raised (by means not shown) to the level of probe assembly 20, and then lowered so as to be spaced from the probe assembly. If material 28 is of a type that coats the probe assembly, such coating will remain on the probe and be taken into consideration during the ensuing calibration operation. With the material level lowered, an operator may push button 40 to initiate the automatic calibration mode of operation. The resonance characteristics of circuit 14 are then automatically varied or adjusted by calibration circuit 34 (FIGS. 1 and 2) in a preselected or preprogrammed manner until the output of phase detector 32 indicates that the return signal from the parallel combination of resonant circuit 14 and capacitance probe 18 bears a preselected phase relationship to the oscillator reference input to phase detector 32, which phase relationship thus corresponds to an effective first or reference capacitance level (Vr) at calibration circuit 34 indicative of a low material level.

Thereafter, during the normal operating mode, the output of phase detector 32 is compared in threshold detector 36 to a reference input from calibration circuit 34 (FIGS. 1 and 2) indicative of the reference capacitance level. This reference input (Vr in FIGS. 1 and 2) is applied in threshold detector 36 to a reference input of a comparator 70 across three parallel sensitivity adjustment resistors 80,81,82,87. Resistors 80,81,82 are connected to the comparator reference input by jumpers or switches 84,85,86. Thus, resistors 80,81,82,87 cooperate with resistor 56 to set the reference input to comparator 70, with resistors 80,81,82,87 selecting sensitivity (Vs) of the comparator to changes in material level. Switches 84,85,86 may be selectively removed (opened) by an operator. Threshold detector 36 provides an output to material level indicating circuitry 38 when the sensed material capacitance exceeds the reference capacitance level by a predetermined amount, which is selected as a function of material dielectric constant. That is, threshold detector 36 provides such indication when the signal from phase detector 32 reaches the second level Vs determined by the combination of resistors 56, 80–82 and 87. If probe assembly 20 is placed in the upper portion of vessel 22 as shown in FIG. 1, material proximity to the probe would normally indicate a full tank or high-level condition. If, on the other hand, probe assembly 20 is disposed in the lower portion of tank 22, material would normally be in proximity to the probe assembly, and indeed would normally cover the probe assembly, so that absence of such proximity would indicate an empty tank or low-level condition.

Figure 2:
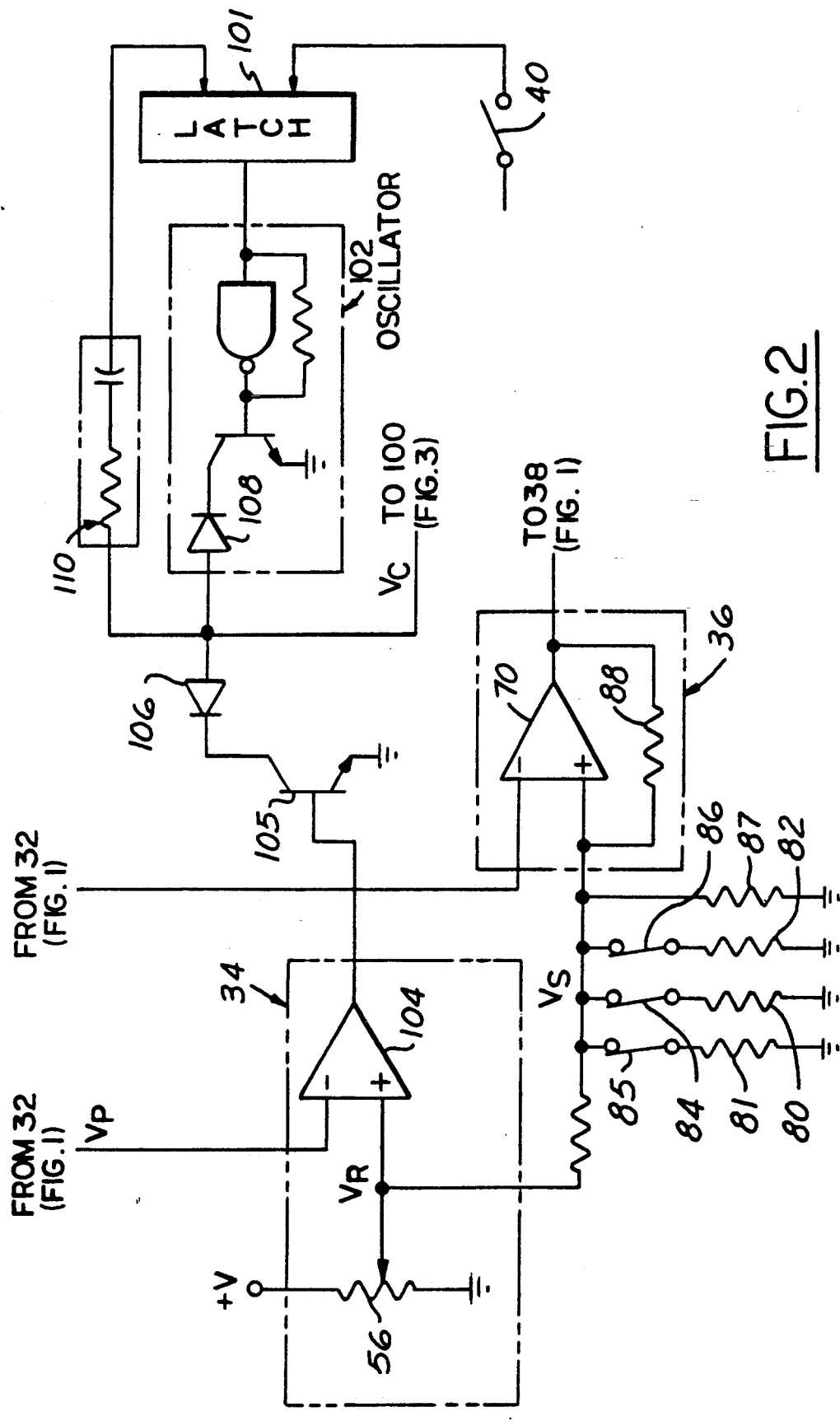
FIG. 2 is a fragmentary electrical schematic diagram showing the automatic calibration and threshold detector circuits of FIG. 1 in greater detail.
Figure 3:
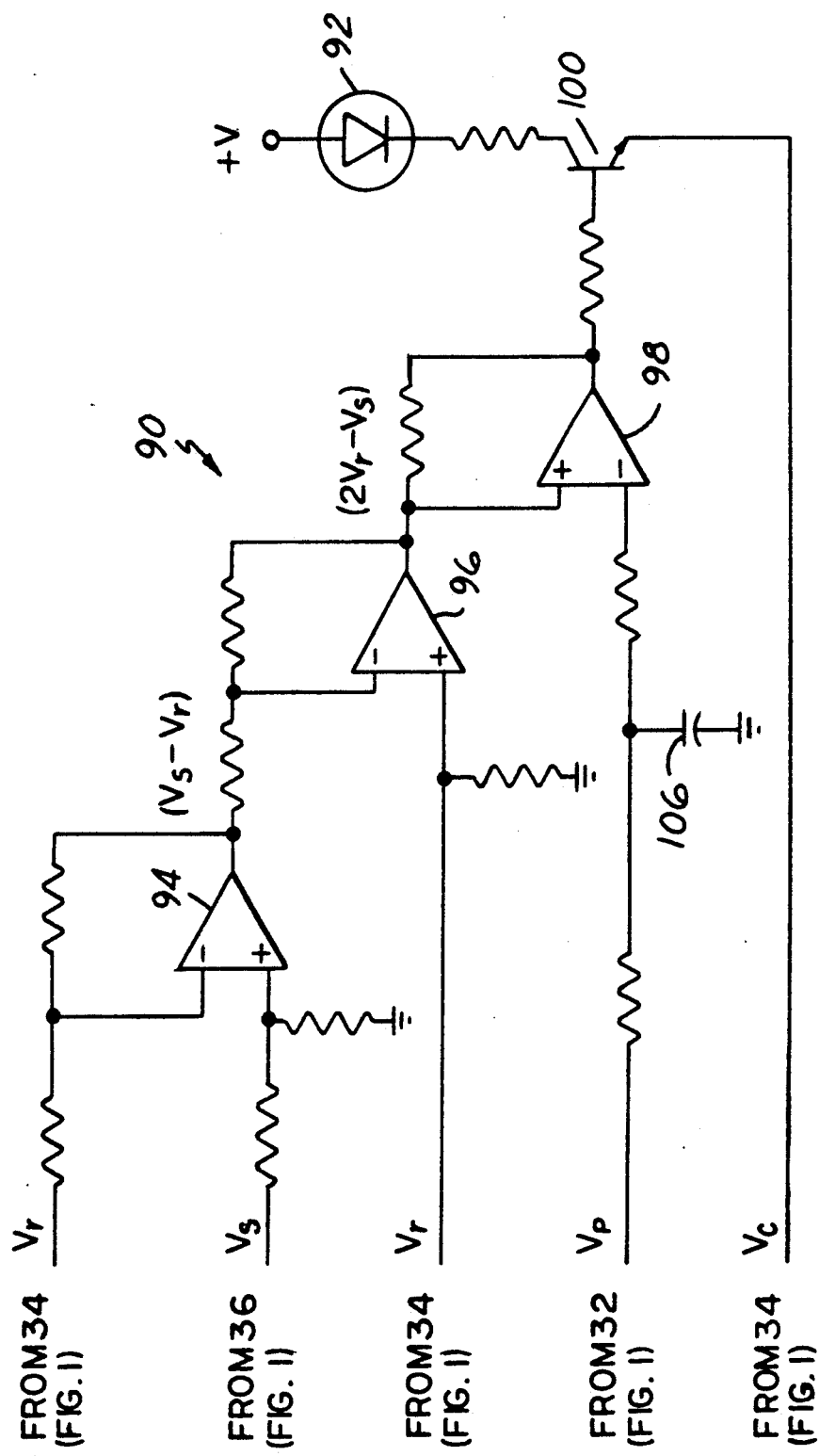
FIG. 3 is an electrical schematic diagram showing the status lamp control circuit of FIG. 1 in greater detail.

To the extent thus far described, the circuitry of FIGS. 1–3 is similar to that disclosed in above-noted and above-referenced U.S Pat. Nos. 4,499,766.

In accordance with the present invention, automatic calibration circuit 36 (FIG. 2) further includes a latch 101 that receives a set input from calibration initiation switch 40. The output of latch 100 is connected to the control input of an oscillator 102 The output of oscillator 102 is wire "0Red" with the output of comparator 104, through isolation diodes 106, 108, to form output Vc. The output of oscillator 102 is also connected by a one-shot 110 to the reset input of latch 101. A status lamp control circuit 90 (FIGS. 1 and 3) has inputs connected to receive the output (Vp) from phase detector 32, the outputs (Vc and Vr) from automatic calibration circuit 34, and the sensitivity reference diode (Vs) from detector 36. The output of status lamp control circuit 90 drives an LED 92. Referring to FIG. 3, the signals Vr and Vs are connected to respective inputs of a comparator 94, which thus supplies at its output an analog voltage indicative of the difference (Vs−Vr) between the respective inputs. This difference is applied to a second comparator 96, which receives the signal Vr as a second input, and thus supplies at its output a signal equal to the quantity (2Vr−Vs). This signal is applied to one input of a comparator 98. The second input of comparator 98 receives the output Vp of phase detector 32 through an integrator consisting of a resistor 105 and a capacitor 106. The output of comparator 98 drives a transistor 100, which is connected to LED 92 so as to illuminate LED 92 when transistor 100 is conductive, and to extinguish LED 92 when transistor 100 is non-conductive. Signal Vc from calibration circuit 34 is also connected to the emitter of transistor 100 to extinguish LED 92 during a calibration operation.

In a calibration mode of operation, latch 101 is initially set by closure of switch 40, and oscillator 102 is disabled. The output Vp from phase detector 32 is initially very high, so that comparator 98 is disabled. Output Vc is high, disenabling transistor 100 and extinguishing LED 92. When the calibration mode of operation is terminated, the output Vp from phase detector 32 is less than the reference input (2Vr−Vs) at comparator 98, so that comparator 98 is turned on. At the end of calibration, comparator 104 drives Vc low through transistor 105 and diode 106. Latch 101 is set by one-shot 110, and oscillator 102 is enabled. However Vc is held continuously low by transistor 105, to enable operation of transistor 100 and illuminate LED 92. Normally, as material level increases, output Vp of phase detector 32 decreases in voltage, so that LED 92 continues to be illuminated, and the detection circuitry operates as described above and in the referenced patents.

If probe 20 begins to desense, for example due to build-up of conductive material between element 18 and guard 26, or due to temperature drift, phase detector output Vp increases. When output Vp exceeds reference Vr, the output of comparator 34 goes low and transistor 105 turns off. Voltage Vc is then controlled by oscillator 102, and LED 92 is pulsed by oscillator 102 so as to flash a warning that the probe is becoming desensitized. However, when Vp increases further above the reference input to comparator 98 (i.e., the third level 2Vr−Vs at the output of comparator 96), comparator 98 and transistor 100 are turned off, and LED 92 is extinguished (independently of oscillator 102) to indicate loss of calibration to an operator.

In this respect, and as distinguished from the prior art, it will be noted that the reference input to comparator 98 varies inversely with operator-selected sensitivity. For example, system sensitivity would be set relatively low for use in conjunction with material having a high dielectric constant, so that a greater change in capacitance would take place between the calibration (low) material level and the material level at which the capacitance at the probe indicates a high material level. On the other hand, for system use in conjunction with material having a lower dielectric constant, system sensitivity is set at a higher level because a change in material level between the low or calibration level and the high material level will result in a lesser change in capacitance at the probe. Since the phase detector output is compared to sensitivity level Vs in accordance with the present invention, as well as the calibration reference level Vr, an increase in phase detector output needed to show a loss of calibration condition automatically changes with desired sensitivity level. Thus, for situations in which low sensitivity is desired—i.e., materials of high dielectric constant —a greater increase in phase detector output would be needed to indicate a loss of calibration condition than would be the case if lower sensitivity is selected.

Although the invention has been described in conjunction with two presently preferred embodiments thereof, modifications and variations can be implemented without departing from the principles of the present invention in their broadest aspects. For example, although the invention has been disclosed in conjunction with automatic calibration of so-called guarded capacitance-type material level indicating systems, it will be recognized that the principles of the invention could as readily be implemented in systems of the described character having manual rather an automatic calibration facility. The invention may be implemented using lights of different colors, as a supplement to or in place of the flashing lights. In the same way, the principles of the invention can be implemented in other types of systems for indicating characteristics of material in which it is desired both to provide for calibration and out-of-calibration indication, and for operator selection of system sensitivity according to the particular operating characteristics of the material in question.

We claim:

1. A system for indicating a condition of material comprising:
   probe means adapted to be positioned with respect to the material such that an electrical property of said probe means varies as a function of material condition,
   circuit means coupled to said probe means and responsive to said electrical property of said probe means for indicating said material characteristic, said circuit means including:

means coupled to said probe means for providing a first electrical signal that varies as a function of said electrical property at said probe means, means for calibrating said circuit means such that said first electrical signal is at a first predetermined level independent of material at said probe means, means responsive to variation of said first signal from said first predetermined level to a second predetermined level for indicating said material characteristic, including sensitivity adjustment means for selectively varying said second predetermined level so as to vary sensitivity of said circuit means, and means responsive to said first signal and coupled to said sensitivity adjustment means for indicating loss of calibration at said circuit means when said first signal reaches a third level, including means for varying said third level as a function of sensitivity of said circuit means such that departure of said first signal from said first level to indicate loss of calibration at said circuit means increases with decreasing sensitivity at said circuit means.

2. The system set forth in claim 1 wherein said means for varying said third level comprises means for providing a second signal as a function of a comparison of said first and second levels, said means for indicating loss of calibration comprising means for comparing said first signal to said second signal.

3. The system set forth in claim 1 wherein said means for indicating loss of calibration further comprises means for indicating departure of said first signal from said first level toward said third level for indicating impending loss of calibration.

4. The system set forth in claim 1 wherein said means for indicating loss of calibration comprises an LED having first and second states of illumination (illuminated and not illuminated), means responsive to comparison of said first signal to said first level for energizing said LED at one of said states when said circuit means is calibrated, means responsive to comparison of said first signal and said second level for energizing said LED at the other of said states when said circuit means is out of calibration, and means responsive to said first signal between said second and third levels for flashing said LED between said first and second states.

5. A system for indicating a condition of material as a function of material capacitance comprising:

a capacitance probe adapted to be positioned so as to be responsive to variations in capacitance as a function of material condition, circuit means responsive to capacitance at said probe and to a reference signal for indicating material condition, including means for selectively adjusting sensitivity of said circuit means to material capacitance so as to adapt said system for material of differing capacitance characteristics, calibration means for establishing said reference signal, including means for varying operating characteristics of said circuit means during a calibration mode of operation independent of material condition so as to calibrate said circuit means to capacitance at said probe, and means responsive to a comparison between said reference signal and capacitance at said probe for indicating when said circuit means is out of calibration, including means coupled to said sensitivity-adjusting means for varying said comparison as a function of said differing material capacitance characteristics.

* * * * *